(12) United States Patent
Zomet

(10) Patent No.: US 9,071,714 B2
(45) Date of Patent: Jun. 30, 2015

(54) LENTICULAR IMAGE ARTICLES AND METHOD AND APPARATUS OF REDUCING BANDING ARTIFACTS IN LENTICULAR IMAGE ARTICLES

(71) Applicant: HumanEyes Technologies Ltd., Jerusalem (IL)

(72) Inventor: Assaf Zomet, Jerusalem (IL)

(73) Assignee: HumanEyes Technologies Ltd., Jerusalem (IL)

( * ) Notice: Subject to any disclaimer, the term of this patent is extended or adjusted under 35 U.S.C. 154(b) by 0 days.

(21) Appl. No.: 14/468,395

(22) Filed: Aug. 26, 2014

(65) Prior Publication Data

US 2014/0362388 A1 Dec. 11, 2014

Related U.S. Application Data

(63) Continuation of application No. 13/521,252, filed as application No. PCT/IL2011/000046 on Jan. 13, 2011, now Pat. No. 8,854,684.

(60) Provisional application No. 61/294,843, filed on Jan. 14, 2010.

(51) Int. Cl.
| | | |
|---|---|---|
| *H04N 1/00* | (2006.01) | |
| *H04N 1/60* | (2006.01) | |
| *H04N 1/407* | (2006.01) | |
| *H04N 1/409* | (2006.01) | |
| *H04N 1/403* | (2006.01) | |

(Continued)

(52) U.S. Cl.
CPC ............ *H04N 1/00734* (2013.01); *H04N 1/23* (2013.01); *H04N 1/00201* (2013.01); *G02B 3/005* (2013.01); *G02B 27/2214* (2013.01); *G03B 25/02* (2013.01); *G03B 35/14* (2013.01); *G03B 35/24* (2013.01); *H04N 13/0018* (2013.01); *H04N 13/0022* (2013.01); *H04N 13/0404* (2013.01); *H04N 13/0415* (2013.01); *H04N 13/0425* (2013.01)

(58) Field of Classification Search
None
See application file for complete search history.

(56) References Cited

U.S. PATENT DOCUMENTS

| 5,503,152 A | 4/1996 | Oakley et al. | |
|---|---|---|---|
| 5,924,870 A * | 7/1999 | Brosh et al. | 434/365 |

(Continued)

FOREIGN PATENT DOCUMENTS

| EP | 0751689 | 1/1997 |
|---|---|---|
| EP | 0791847 | 8/1997 |

(Continued)

OTHER PUBLICATIONS

Official Action Dated Aug. 28, 2014 From the US Patent and Trademark Office Re. U.S. Appl. No. 13/388,069.

(Continued)

*Primary Examiner* — Satwant Singh

(57) ABSTRACT

A method of creating a lenticular imaging article. The method comprises printing an interlaced composite image according to a reference grid of a printer, providing a lenticular lens sheet having a plurality of parallel lenticular lines between a plurality of lenslets, selecting an acute angle for an intersection between the first and second axes according to a function of a resolution of the interlaced composite image and a pitch of the lenticular lens sheet, and positioning the lenticular lens sheet so that the intersection forms the acute angle.

9 Claims, 6 Drawing Sheets

(51) Int. Cl.
*H04N 1/23* (2006.01)
*G02B 3/00* (2006.01)
*G03B 25/02* (2006.01)
*G03B 35/14* (2006.01)
*G03B 35/24* (2006.01)
*H04N 13/00* (2006.01)
*H04N 13/04* (2006.01)
*G02B 27/22* (2006.01)

(56) References Cited

U.S. PATENT DOCUMENTS

| | | | |
|---|---|---|---|
| 5,959,718 | A | 9/1999 | Morton |
| 6,373,637 | B1 * | 4/2002 | Gulick et al. ............... 359/619 |
| 6,406,428 | B1 | 6/2002 | Mittelstaedt |
| 7,477,450 | B2 * | 1/2009 | Abe ............................ 359/455 |
| 7,746,554 | B2 * | 6/2010 | Katsura et al. ............... 359/455 |
| 7,929,182 | B2 | 4/2011 | Mochizuki et al. |
| 8,854,684 | B2 * | 10/2014 | Zomet ......................... 358/1.6 |
| 2002/0126202 | A1 | 9/2002 | Wood et al. |
| 2003/0026474 | A1 | 2/2003 | Yano |
| 2003/0035555 | A1 | 2/2003 | King et al. |
| 2005/0033160 | A1 | 2/2005 | Yamagata et al. |
| 2005/0191104 | A1 | 9/2005 | Goggins |
| 2005/0248850 | A1 * | 11/2005 | Goggins ...................... 359/619 |
| 2006/0066879 | A1 * | 3/2006 | Bast et al. ................... 358/1.1 |
| 2006/0072175 | A1 | 4/2006 | Oshino |
| 2006/0088206 | A1 | 4/2006 | Era |
| 2006/0115180 | A1 * | 6/2006 | Adams et al. ............... 382/284 |
| 2006/0120593 | A1 | 6/2006 | Oshino |
| 2008/0151198 | A1 * | 6/2008 | Hine ............................. 353/98 |
| 2009/0141123 | A1 | 6/2009 | Conley |
| 2009/0213210 | A1 | 8/2009 | Conley |
| 2010/0099991 | A1 | 4/2010 | Snyder |
| 2011/0116058 | A1 * | 5/2011 | Ota et al. ...................... 355/22 |
| 2011/0157155 | A1 * | 6/2011 | Turner et al. ................ 345/419 |
| 2012/0131442 | A1 | 5/2012 | Grizim et al. |
| 2012/0287447 | A1 | 11/2012 | Zomet |
| 2012/0288184 | A1 * | 11/2012 | Zomet ......................... 382/154 |

FOREIGN PATENT DOCUMENTS

| | | |
|---|---|---|
| EP | 0805041 | 11/1997 |
| EP | 1343334 | 9/2003 |
| EP | 1683485 | 7/2006 |
| JP | 06-149957 | 5/1994 |
| JP | 09-074573 | 3/1997 |
| JP | 09-236777 | 9/1997 |
| JP | 2003-284098 | 10/2003 |
| JP | 2005-169070 | 6/2005 |
| JP | 2006-107213 | 4/2006 |
| JP | 2006-163278 | 6/2006 |
| JP | 2006-204920 | 8/2006 |
| WO | WO 2005/084298 | 9/2005 |
| WO | WO 2008/087632 | 7/2008 |

OTHER PUBLICATIONS

Advisory Action Before the Filing of an Appeal Brief Dated Jun. 9, 2014 From the US Patent and Trademark Office Re. U.S. Appl. No. 13/388,069.
Communication Under Rule 71(3) EPC Dated Jul. 26, 2013 From the European Patent Office Re. Application No. 11710028.9.
International Preliminary Report on Patentability Dated Feb. 16, 2012 From the international Bureau of WIPO Re. Application No. PCT/IL2010/000632.
International Preliminary Report on Patentability Dated Jul. 26, 2012 From the International Bureau of WIPO Re. Application No. PCT/IL2011/000046.
International Preliminary Report on Patentability Dated Jul. 26, 2012 From the International Bureau of WIPO Re. Application No. PCT/IL2011/000048.
International Search Report and the Written Opinion Dated May 4, 2011 From the International Searching Authority Re. Application No. PCT/IL2011/000048.
International Search Report and the Written Opinion Dated Dec. 7, 2010 From the International Searching Authority Re. Application No. PCT/IL2010/000632.
International Search Report and the Written Opinion Dated May 16, 2011 From the International Searching Authority Re. Application No. PCT/IL2011/000047.
International Search Report and the Written Opinion Dated May 17, 2011 From the International Searching Authority Re. Application No. PCT/IL2011/000046.
Notice of Allowance Dated Jun. 16, 2014 From the US Patent and Trademark Office Re. U.S. Appl. No. 13/521,252.
Notice of Reason for Rejection Dated Aug. 1, 2014 From the Japanese Patent Office Re. Application No. 2012-523435 and Its Translation Into English.
Official Action Dated Aug. 11, 2014 From the US Patent and Trademark Office Re. U.S. Appl. No. 13/521,249.
Official Action Dated Jan. 16, 2014 From the US Patent and Trademark Office Re. U.S. Appl. No. 13/521,249.
Official Action Dated Jul. 23, 2013 From the US Patent and Trademark Office Re. U.S. Appl. No. 13/388,069.
Official Action Dated Feb. 25, 2014 From the US Patent and Trademark Office Re. U.S. Appl. No. 13/388,069.
Official Action Dated Feb. 25, 2014 From the US Patent and Trademark Office Re. U.S. Appl. No. 13/521,252.
Notice of Reason for Rejection Dated Nov. 25, 2014 From the Japanese Patent Office Re. Application No. 2012-548534 and Its Translation Into English.
Notice of Allowance Dated Oct. 21, 2014 From the US Patent and Trademark Office Re. U.S. Appl. No. 13/521,249.
Decision of Rejection Dated Jan. 6, 2015 From the Japanese Patent Office Re. Application No. 2012-523435.

* cited by examiner

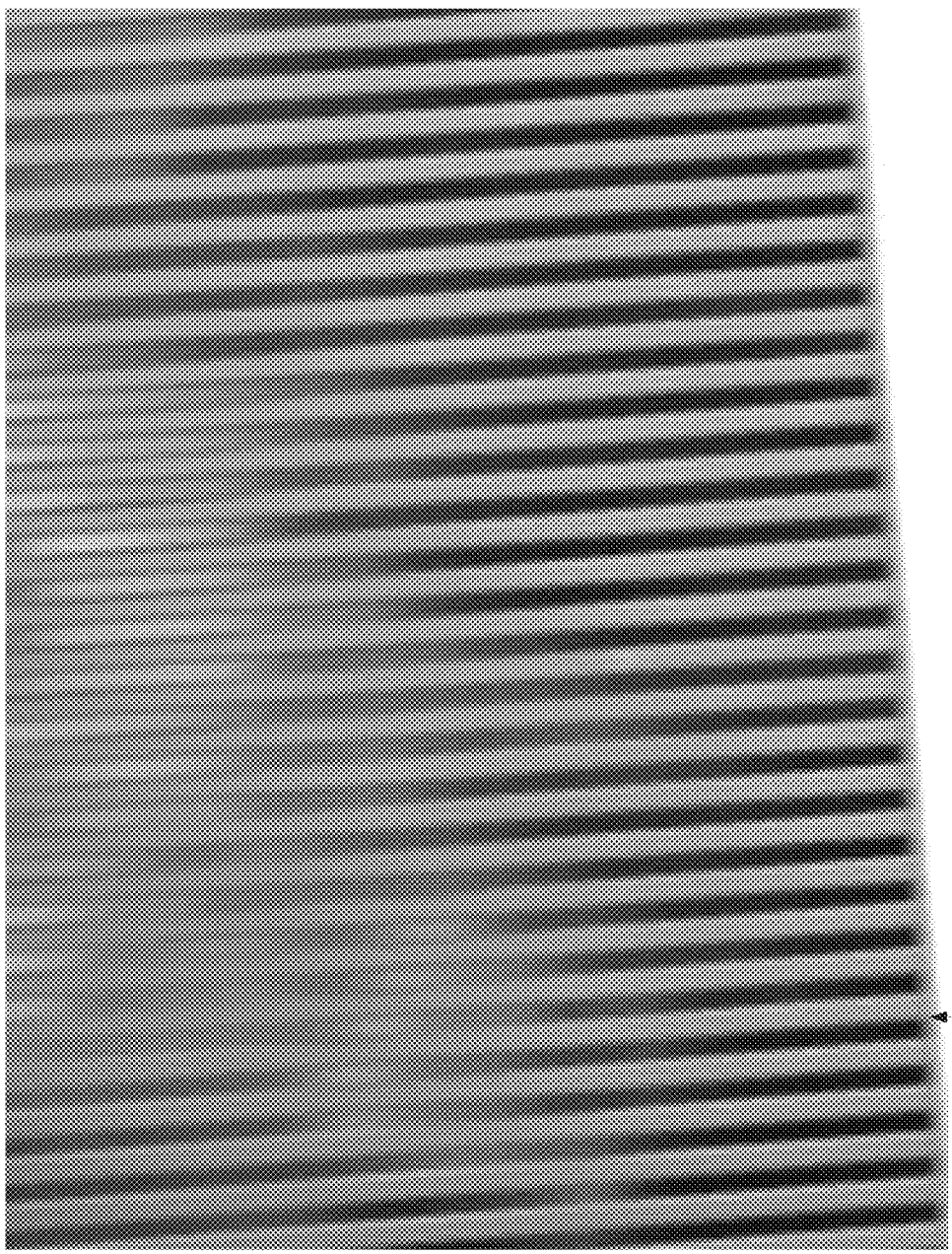

ically, the lower the resolution of a printing system, the larger the banding artifact.

LENTICULAR IMAGE ARTICLES AND METHOD AND APPARATUS OF REDUCING BANDING ARTIFACTS IN LENTICULAR IMAGE ARTICLES

RELATED APPLICATIONS

This application is a continuation of U.S. patent application Ser. No. 13/521,252 filed on Jul. 10, 2012, which is a National Phase of PCT Patent Application No. PCT/IL2011/000046 having International filing date of Jan. 13, 2011, which claims the benefit of priority under 35 USC §119(e) from U.S. Provisional Patent Application No. 61/294,843 filed on Jan. 14, 2010. The contents of the above applications are all incorporated herein by reference as if fully set forth herein in their entirety.

FIELD AND BACKGROUND OF THE INVENTION

The present invention, in some embodiments thereof, relates to lenticular printing and, more particularly, but not exclusively, to lenticular image articles and methods for reducing or eliminating banding artifacts in lenticular printing products such as lenticular image articles.

Lenticular printing is a process consisting of creating a composite interlaced image by interlacing various images, and attaching it with a lenticular lens arrangement, such as a sheet, to form a lenticular image article. When digitally processing the composite interlaced image, various images are collected are flattened into individual, different frame files, and then digitally combined by interlacing into a single final file in a process which may be referred to herein as interlacing. The lenticular printing can be used to create a dynamic image, for example by offsetting the various layers at different increments in order to give a three dimension (3D) effect to the observer, various frames of animation that gives a motion effect to the observer, a set of alternate images that each appears to the observer as transforming into another. One of the most common methods of lenticular printing, which accounts for the vast majority of lenticular images in the world today, is lithographic printing of the composite interlaced image directly onto lower surface of a lenticular lens sheet.

In order to improve the clarity of the effect of the dynamic image to the observer, some artifacts may be reduced. One of the reduced artifacts, is banding. In some cases, the banding artifact is formed when transition starts in several places and progresses from each starting point towards the next, giving the impression of several curtains crossing the visual. The unwanted bands appear typically in parallel to the lens direction. The banding may be caused because of a mismatch between the printing resolution, denoted herein as D, and the lenticular sheet pitch, denoted herein as P, such that D/P is a non-integer number.

One of the known methods for reducing banding is adding blur to the composite interlaced image which can be implemented for example by interlacing not only the set of input images but also an additional set of so-called separator images. These separator images are created, for example, as an averaging of the input images. It should be noted that the use of separator images increases the mixing among views and hence increases ghosting and blur and provides only a partial reduction in the banding artifact.

Another known method for reducing banding is modifying the resolution of the printing system to match the lenticular sheet pitch, for example by changing the distances of laser dots in an offset plate setter. This is possible to do only in printing systems with variable resolution.

SUMMARY OF THE INVENTION

According to some embodiments of the present invention, there is provided a method of creating a lenticular imaging article with a reduced banding artifact. The method comprises printing an interlaced composite image according to a reference grid of a printer, the reference grid being parallel to a first axis, providing a lenticular lens sheet having a plurality of parallel lenticular lines between a plurality of lenslets, each the lenticular line being parallel to a second axis, selecting an acute angle for an intersection between the first and second axes according to a function of a resolution of the interlaced composite image and a pitch of the lenticular lens sheet, and positioning the lenticular lens sheet so that the intersection forms the acute angle.

Optionally, the interlaced composite image having a plurality of bands tilted in about the acute angle.

More optionally, the setting comprises calculating the acute angle so that the resolution divided by the pitch multiple a cosine of the acute angle equals an integer.

Optionally, the setting comprising:
sequentially adjusting the acute angle in a plurality of trial sessions,
allowing an observer to determine when the lenticular imaging article has low banding artifact according to the plurality of trail sessions, and
fixating the adjusted acute angle according to the observer's determination.

Optionally, the printing comprises printing the interlaced composite image on the lenticular lens sheet.

Optionally, the printing comprises printing the interlaced composite image on a medium, the positioning comprising attaching the medium to the lenticular lens sheet.

Optionally, the first axis is tilted in relation to the edges of the lenticular lens sheet.

According to some embodiments of the present invention, there is provided a lenticular imaging article with a reduced banding artifact. The lenticular imaging article comprises a lenticular lens sheet having a plurality of lenslets separated by a plurality of parallel lenticular lines aligned in parallel to a first axis, and an interlaced composite image positioned to face the lenticular lens sheet and printed according to a reference grid of a printer which is aligned in parallel to a second axis. The intersection between the first and second axes forms an acute angle adapted to a resolution of the interlaced composite image and a pitch of the lenticular lens sheet.

Optionally, the first axis is tilted in relation to an edge of the lenticular lens sheet.

Optionally, the interlaced composite image is printed on a side of the lenticular lens sheet.

Optionally, the interlaced composite image is printed on a media attached to a side of the lenticular lens sheet.

Optionally, the lenticular imaging article has reduced banding artifact in relation to a similar lenticular imaging article having a plurality of similar lenslets being in parallel to another interlaced composite image printed in a similar reference grid aligned in parallel to the second axis.

According to some embodiments of the present invention, there is provided a lenticular imaging article with a reduced banding artifact. The lenticular imaging article comprises a lenticular lens sheet having a plurality of lenslets separated by a plurality of parallel lenticular lines aligned in parallel to a first axis, the first axis being tilted in an acute angle in relation to a plurality of edges of the lenticular lens sheet and an interlaced composite image printed to face the lenticular lens sheet and printed according to a reference grid of a printer which is aligned in parallel to a second axis, the second axis being parallel to the at least two of the plurality of edges.

According to some embodiments of the present invention, there is provided a method of printing a lenticular composite image for lenticular articles with a reduced banding artifact. The method comprises providing a lenticular lens sheet having a plurality of sheet lateral edges and a plurality of lenticules aligned in parallel to a first axis, the first axis being tilted in an acute angle in relation to the plurality of sheet lateral edges, cutting a plurality of plate lateral edges of at least one rectangle offset plate in parallel to the plurality of sheet lateral edges, and printing an interlaced composite image using the at least one rectangle offset plate.

Optionally, the printing comprises printing the interlaced composite image on a medium; further comprising fixating the lenticular lens sheet in relation to the medium.

More optionally, the printing comprises printing the interlaced composite image on the medium to the lenticular lens sheet.

Optionally, the acute angle is adapted to a resolution of the interlaced composite image and a pitch of the lenticular lens sheet.

According to some embodiments of the present invention, there is provided a computer program product, comprising at least one computer usable medium having a computer readable program code embodied therein, the computer readable program code adapted to be executed to implement a method of creating a lenticular imaging article with a reduced banding artifact. The method comprises generating printing instructions for printing an interlaced composite image according to a reference grid of a printer, the reference grid being parallel to a first axis, computing an acute angle for an intersection between the first axis and a second axis parallel to a plurality of parallel lenticular lines between a plurality of lenslets of a lenticular lens sheet, the computing being performed using a function of a resolution of the interlaced composite image and a pitch of the lenticular lens sheet, and instructing the positioning of the lenticular lens sheet so that the intersection forms the acute angle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2B is an exemplary interlaced composite image, according to some embodiments of the present invention;

DESCRIPTION OF EMBODIMENTS OF THE INVENTION

Figure 1:
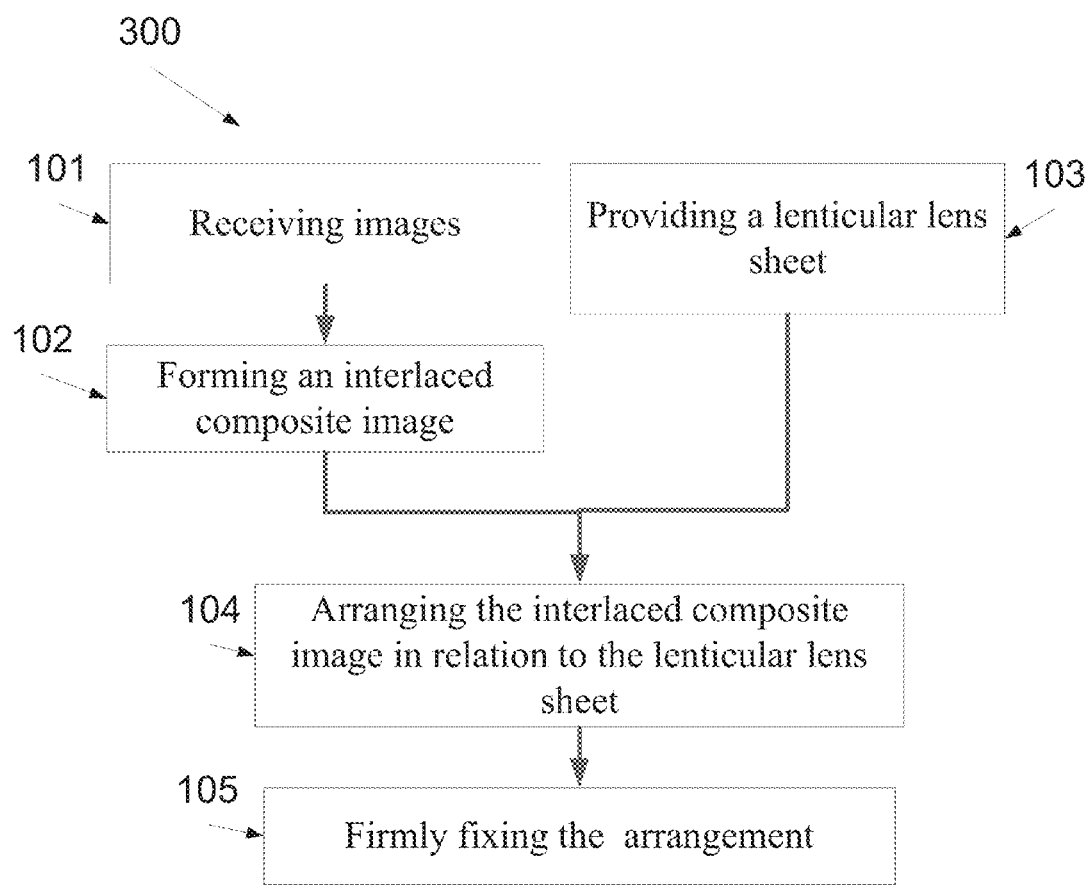
FIG. 1 is a schematic illustration of a method of creating a lenticular imaging article having a reduced banding effect, according to some embodiments of the present invention.

The present invention, in some embodiments thereof, relates to lenticular printing and, more particularly, but not exclusively, to lenticular image articles and methods for reducing or eliminating banding artifacts in lenticular printing products such as lenticular image articles.

According to some embodiments of the present invention, there is provided a lenticular imaging article having a lenticular lens sheet and an interlaced composite image printed according to a reference grid of a printer, which is positioned to face the lenticular lens sheet so that an acute angle (a) is formed at the intersection between an axis that is parallel to the lenslets of the lenticular lens sheet and another axis that is parallel to one or more axes of the reference grid. Optionally, the lenticular lens sheet and the interlaced composite image are firmly fixated to one another. Optionally, the interlaced bands of the interlaced composite image are tilted to match the tilting angle of the lenslets of the lenticular lens sheet, for example about the acute angle. The acute angle is set so as to reduce banding artifacts of the lenticular imaging article. Optionally, the acute angle is set according to the pitch (P) of the lenticular lens sheet and according to the resolution of the interlaced composite image (D) such that D/(P*cos(α)) is an integer number.

The acute angle reduces or eliminates the banding effect from the lenticular imaging article, optionally without changing or adapting the resolution of the printing system. This allows printing the lenticular imaging article in printing systems with a fixed resolution, for example inkjet printing systems, offset printing systems and silver halide digital printing systems.

According to some embodiments of the present invention, there is provided a method of creating such a lenticular imaging article. The method is based on positioning an interlaced composite image, which is printed according to a reference grid of a printer, so that it faces a lenticular lens sheet having a plurality of parallel lenticular lines between a plurality of lenslets. The interlaced composite image is positioned so that an intersection between an axis, which is parallel to one of the axes of the reference grid, and another axis, which is parallel to the lenslets, forms an acute angle.

According to some embodiments of the present invention, there is provided a lenticular imaging article that comprises an interlaced composite image and a lenticular lens sheet. The lenticular lens sheet has titled lenslets separated by tilted and parallel lenticular lines which are aligned in parallel. The titled lenslets, and optionally the bands of the interlaced composite image are tilted in an acute angle in relation to a plurality of edges of the lenticular lens sheet. During the forming of the lenticular imaging article, the interlaced composite image is printed according to a reference grid of a printer. The printing is performed so that one of the axes of the reference grid is parallel to two of the edges of the lenticular lens sheet on which the interlaced composite image is printed and/or to which the interlaced composite image is attached.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a method of creating a lenticular imaging article having a reduced banding effect, according to some embodiments of the present invention.

First, as shown at 101, images are received. The images may be taken from a sequence, such as a typical spatio-temporal signal for example a series of sequentially ordered images, a video sequence, or any other series of sequential images. The images may be selected to create a dynamic image, for example a set of offset images selected to give a three dimension (3D) effect to the observer, when interlaced, various frames of one or more moving objects that gives a motion effect to the observer, when interlaced, and/or a set of alternate images that are selected to appear, when interlaced, to the observer as transforming into another. The images may be extracted from a memory device, captured by an imaging device, received from a remote server, selected by a user, and/or created by a user.

Now, as shown at 102, the provided images are interlaced to form an interlaced composite image, also known as a lenticular image. The interlacing is optionally performed to match the tilt angle of the lenticules of the lenticular lens sheet that is provided, as shown at 103. In other words, the interlaced composite image is aligned such that its strips are tilted with respect to a reference grid, which may also be referred to as an image grid, of a printing system, referred to herein also as a printer, so as to be matched to the direction of the lenticules of the lenticular lens sheet. The interlaced composite image 201 is printed according to the reference grid. In printing systems, such as offset printing, for example KBA Karat™, and digital printing, such as Fujifilm Frontier™ and HP Indigo™ 7000, the reference grid is typically implemented by a laser beam that imprints points on a reference grid and then the print is formed according to the imprinted points by impression or by a chemical process. In inkjet printers, the reference grid is realized in some systems by an array of printing heads and by their motion steps. The printed bands of the interlaced composite image are optionally tilted in relation to the reference grid of the printer, for example as further described below.

Optionally, the forming of the interlaced composite image 201 involves assigning brightness intensities or colors, to a set of positions on the reference grid.

As shown at 103, a lenticular lens sheet, which is optionally adapted to the width of the bands of the interlaced composite image, is provided. As used herein, a lenticular lens sheet means any image separating mask, such as an array of lenslets, optionally magnifying, optionally cylindrical, which are optionally designed so that when viewed from a point of view in slightly different angles, light from different segments of a plane parallel to the sheet is directed to the point of view. The lenticular lens sheet has a plurality of parallel lenticular lines each separates between two lenslets of the lenticular lens sheet. The parallel lenticular lines and the lenslets are optionally parallel to a common axis.

Figure 2A:
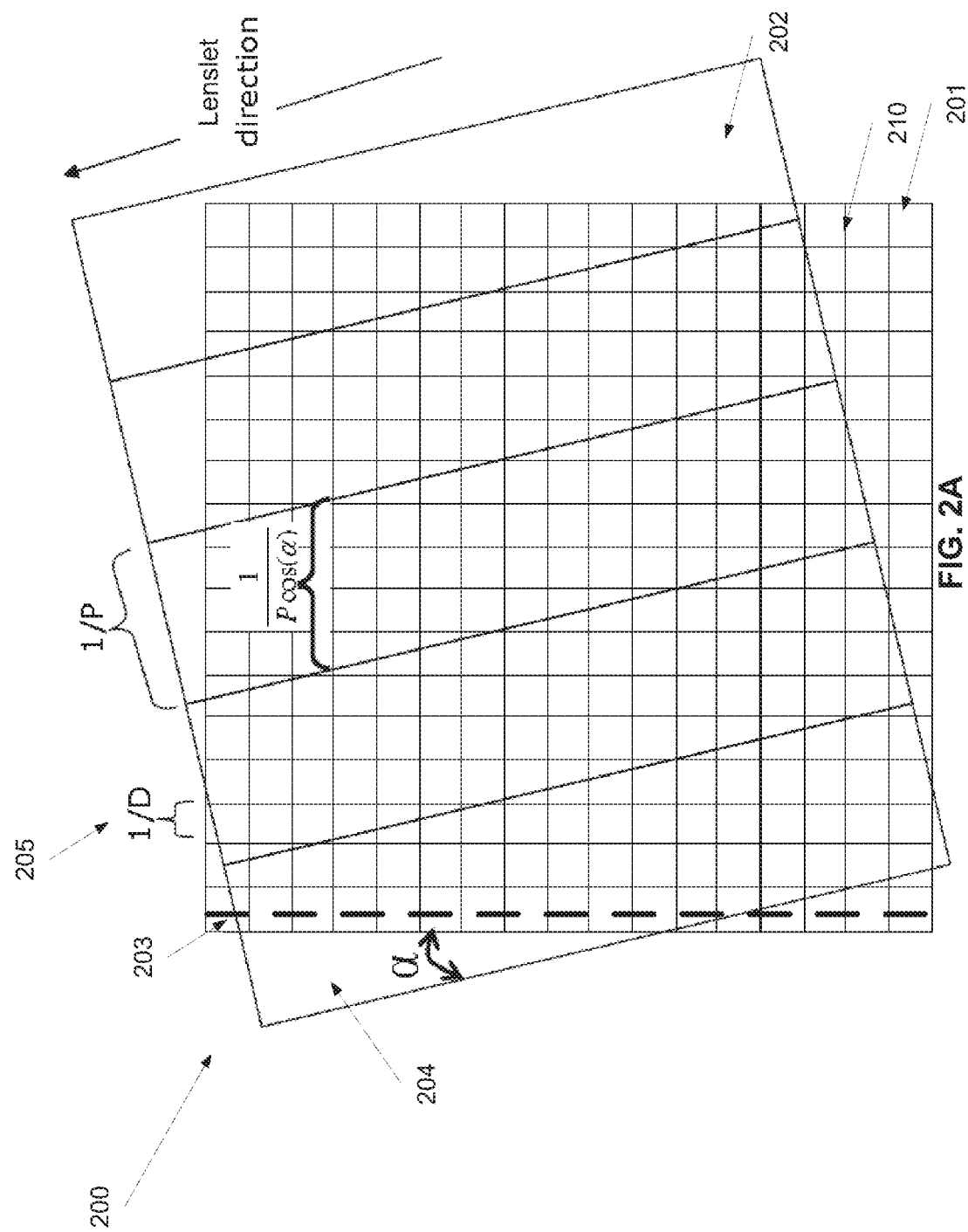
FIG. 2A is a schematic illustration of an arrangement in which an interlaced composite image and a lenticular lens sheet are placed one on top of the other, according to some embodiments of the present invention.

Now, as shown at 104, the lenticular lens sheet is positioned so that the lenticular lines and/or lenslets are tilted in an acute tilt angle in relation to one of the axes of the reference grid of the printer printing the interlaced composite image. The positioning is performed by aligning the lenticular lens sheet before printing the interlaced composite image on the surface thereof or by aligning it in relation to the medium on which the interlaced composite image is printed. For clarity, reference is now made to FIG. 2A, which is a schematic illustration of an arrangement 200 in which an interlaced composite image 201 and a lenticular lens sheet 202 are placed one on top of the other, according to some embodiments of the present invention. In this arrangement 200, the interlaced composite image 201 is printed according to a reference grid 210 having an axis, for example the axis that is marked as numeral 203, which forms an acute angle with another axis that is parallel to the lenticular lens 204 of the lenticular lens sheet 202, for example an acute angle with less than 45° degrees. In this exemplary arrangement 200, the interlaced composite image 201 is pixelated. Numeral 205 depicts a width of an exemplary pixel. As outlined above, the interlaced composite image 201 comprises a plurality of bands. Optionally, the bands are tilted to match the tilted angle of the lenticular lens 204 of the lenticular lens sheet 202. For Example, FIG. 2B depicts an exemplary interlaced composite image with bands, such as 220, which are tilted to match the angle of the lenticular lens 204 of the lenticular lens sheet 202, for example the aforementioned acute angle. For clarity, it should be noted the depicted lenticular lens sheet have substantially vertical lenticular lenses, the teaching of this document also refers to lenticular lens sheets having substantially horizontal lenticular lenses.

The tilt angle is selected such that it reduces banding artifacts. For example, the tilt angle, denoted as α in FIG. 2 is selected such that:

$$\frac{D}{P\cos(\alpha)} \subseteq \Omega \qquad \text{Equation 1}$$

where D denotes the resolution of the final interlaced composite image 201, P denotes the pitch of the lenslets of the lenticular lens sheet 202 and Ω denotes the set of integer numbers. Based on Equation 1, 1/P, when divided by cos(α), has a predefined relation with 1/D and is an integer multiple of 1/D.

In order to comply with Equation 1, an initial interlaced composite image is optionally formed with a resolution S that is an integer multiple of P. The wrapping of this initial interlaced composite image, for example as described below, allows creating the final interlaced composite image, such as 201. Such a resolution S may be defined as follows:

$$S = P * \left(\text{ceil}\left(\frac{D}{P}\right) + k\right) \qquad \text{Equation 2}$$

$$\alpha = a\cos\left(\frac{D}{S}\right)$$

where ceil( ) denotes a ceiling function, rounding up a positive number to the closest integer, acos( ) denotes an inverse of the cosine function cos( ) and k denotes a non-negative integer value that is optionally set to 0.

This allows warping the initial interlaced composite image to include a rotation by angle α and scaling to create the final interlaced image 201 at a resolution D. For example, in case resolution S has been used, a warp matrix combining the rotation and scaling is given by the following Equation:

$$\begin{bmatrix} 1 & \tan(\alpha) \\ -\tan(\alpha) & 1 \end{bmatrix} \qquad \text{Equation 3}$$

To clarify, the scaling component in the warp allows changing the image resolution from S to D.

Alternatively, α is selected according to a calibration process which includes a trial and error procedure in which the arrangement is set with different tilt angles and a viewer chooses the tilt angle that reduces substantially banding artifacts. For example, the tilt angle may be sequentially adjusted in a plurality of trial sessions so as to allow an observer to detect when the lenticular imaging article has low banding artifact. This allows fixating the acute angle according to the observation of the observer.

The interlaced composite image and the lenticular lens sheet 202 are arranged in relation to one another manually, automatically, and/or semi automatically. When the arrangement is performed in a semi-automatic manner, in some embodiments a mechanical element attaches the lenticular lens sheet 202 to the interlaced composite image 201 and then a viewer optionally adjusts the tilt angle between them.

Optionally, in this arrangement, as shown at 105, the interlaced composite image is firmly fixed on top of the lenticular lens sheet, for example printed on the lenticular lens sheet and/or attached to the lenticular lens sheet.

The fixing of the interlaced composite image 201 to the lenticular sheet can be implemented by printing the interlaced composite image 201 according to a reference grid of a printer, as described above, directly on the flat side of the lenticular lens sheet 202 and/or printing the interlaced composite image 201 in the reference grid on some media and/or attaching the media to the lenticular lens sheet 202, for example by lamination.

Figure 3:
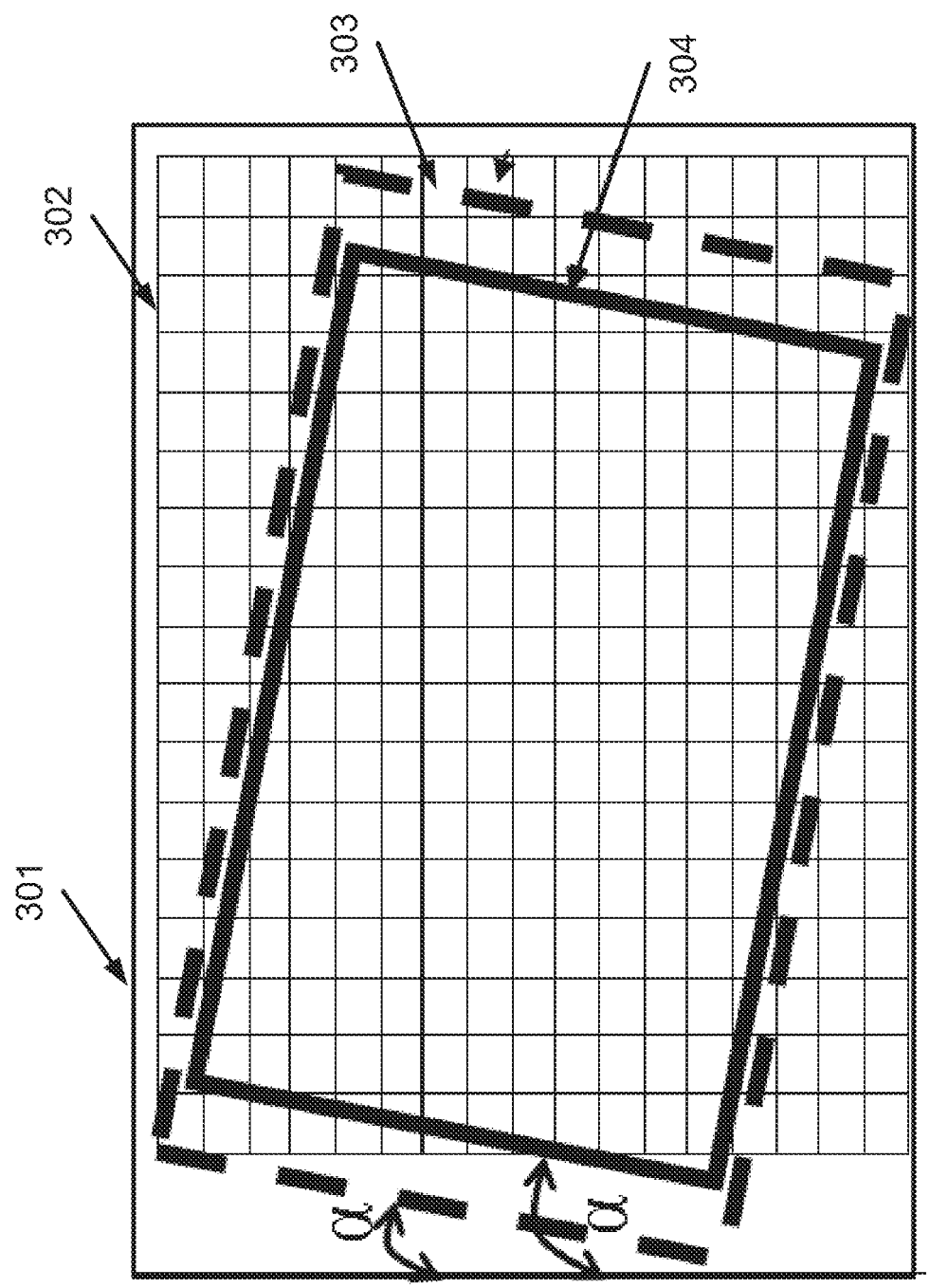
FIG. 3 depicts a schematic illustration of an offset plate that confines an imaging grid in which an area is marked to contain data for forming an interlaced image, according to some embodiments of the present invention.

According to some embodiments of the present invention, the interlaced composite image 201 is printed on the lenticular lens sheet 202 by offset printing, where the tilt angle between the lenticular lens sheet 202 and the interlaced composite image 201 is formed by rotating the reference grid of the interlaced composite image 201 is printed, for example as depicted in FIG. 3, prior to printing it on the lenticular lens sheet 202 or on a media that is about to be attached to the lenticular lens sheet 202. FIG. 3 depicts an offset plate 301 that confines a reference grid 302 in which an area 303 which contains visual data 304 is defined to perform cutting for forming the interlaced image. At first, offset plates are created in a plate setter, for example four plates 301 for Cyan, Magenta, Yellow, and Black, each containing a respective version of the warped interlaced composite image 304 as described for example in Equation 3. Then, the lateral edges of the plates are cut in parallel to the lateral edges of the interlaced composite image 304 as the cut rectangle that is tilted by angle α. Optionally, the plates 301 are cut in a bulk in order to have consistent cutting of all plates 301. Then the plates 301 are mounted on the cylinders of the press, depending on the mechanism of the offset press. In some embodiments, this includes punching holes in the plate (not shown) and folding.

Figure 4:
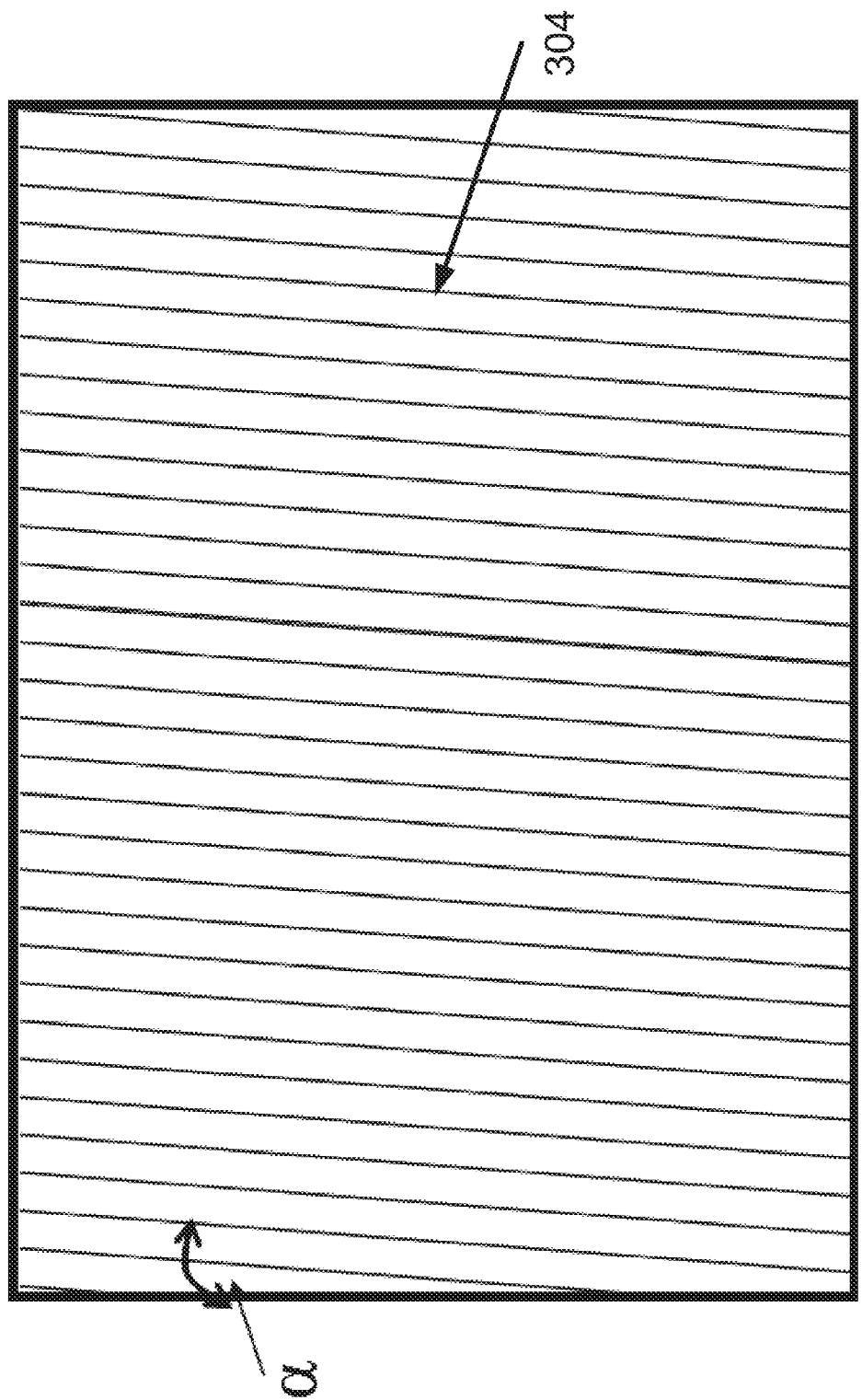
FIG. 4 is a schematic illustration of such a lenticular lens sheet having lenslets which are tilted in relation to its edges, according to some embodiments of the present invention.

In some embodiments of the present invention, lenticular lens sheets are cut before the printing takes place to create an acute angle α between the edge of the lenticular lens sheet and the direction of the lenslets. For example, FIG. 4 is a schematic illustration of such a lenticular lens sheet, according to some embodiments of the present invention. Optionally, such a lenticular lens sheet is fed into a printing device, such as an offset press, so as to allow printing the interlaced composite image 201 on the flat side thereof. In other embodiments, the image is printed on a media, such as a paper or a sticker which is then laminated or adhered to the lenticular lens sheet so that the intersection between the edge of the lenslets and one of the axes of the reference grid of the printer printing the interlaced composite image forms an acute tilt angle.

Figure 5:
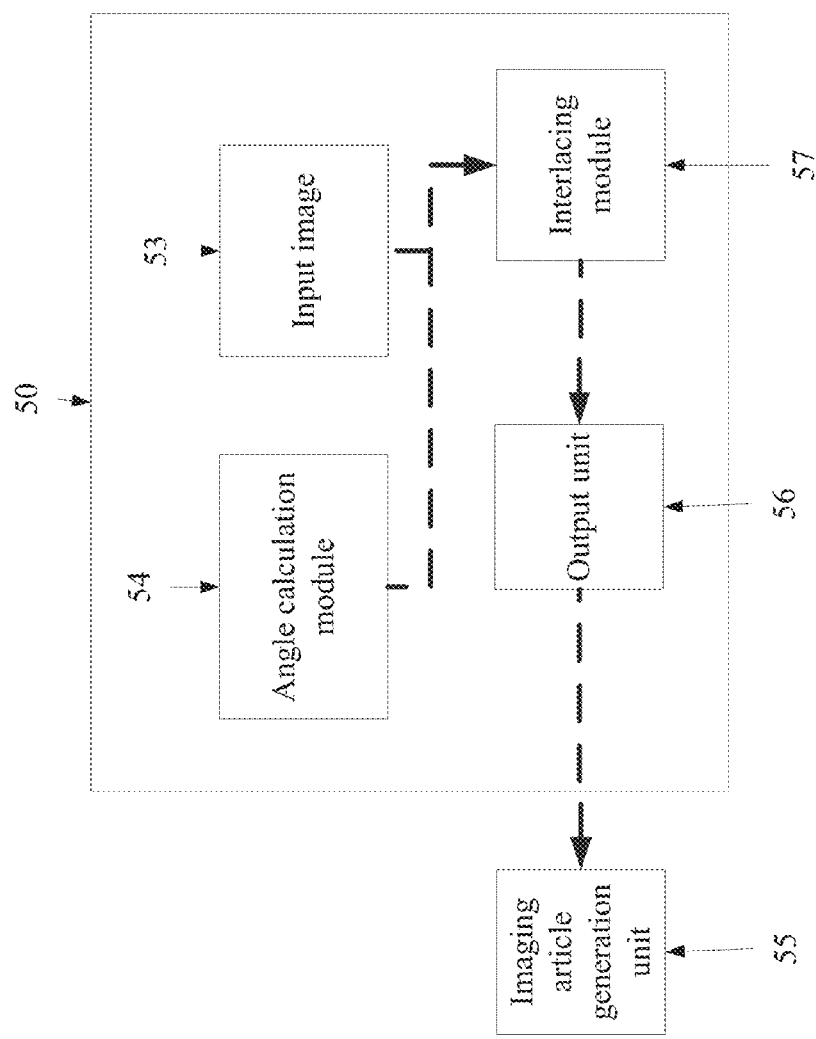
FIG. 5 is a schematic illustration of an apparatus for creating a lenticular imaging article, according to some embodiment of the present invention.

Reference is now made to FIG. 5, which is a schematic illustration of an apparatus 50 for creating a lenticular imaging article that comprises an interlaced composite image and a lenticular lens sheet, according to some embodiment of the present invention. The apparatus 50 comprises an input unit 53 that receives a set of images. As used herein, a set means a typical spatio-temporal signal such as a series of sequentially ordered images, a video sequence, or any other series or group of images. The apparatus 50 comprises an interlacing module 57 that interlaces the received image to print an interlaced composite image therefrom, for example as described above. It should be noted that the interlacing module 57 is not limited for generating interlaced images of a certain kind and may be used in various lenticular printing applications, such as generating three dimensional images. Furthermore, it should be noted that though the embodiments which are disclosed hereinbelow are described with reference to lenticular viewing, printing, and/or, images, they are not limited to lenticular viewing, printing, and/or, images and can be used for other applications and technologies. The apparatus 50 further comprises an interface 56 which communicates with a lenticular imaging article generation unit 55, such as a lenticular imaging articles printer. Optionally, the lenticular imaging article generation unit 55 is set to print the interlaced composite image on lenticular lens sheets or on a medium which is than attached to lenticular lens sheets. The apparatus 50 further comprises an angle calculation module 54 for defining a target angle for the intersection between the lenslets of the lenticular lens sheet and one of the axes of the reference grid of the printing printer according to which the interlaced composite image is printed by the lenticular imaging article generation unit 55. The calculation may be performed as described above. The acute angle is optionally forwarded by the interface 56 to the lenticular imaging article generation unit 55 so that in use the lenticular imaging article generation unit 55 generates lenticular imaging articles with the target angle, according to the injection, for example as described above in relation to the method depicted in FIG. 2A. For example, the angle calculation module 54 may instruct the orientation of the printing image grid of the interlaced composite image or the feeding of the lenticular lens sheets.

It is expected that during the life of a patent maturing from this application many relevant systems and methods will be developed and the scope of the term an image, an offset press, a digital printer, and a computing unit, is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of printing a lenticular composite image for lenticular articles with a reduced banding artifact, comprising:
   providing a lenticular lens sheet having a plurality of sheet lateral edges and a plurality of lenticules aligned in parallel to a first axis, said first axis being tilted in an acute angle in relation to said plurality of sheet lateral edges;
   cutting a plurality of plate lateral edges of at least one rectangle offset plate in parallel to said plurality of sheet lateral edges; and
   printing an interlaced composite image using said at least one rectangle offset plate;
   wherein said lenticular lens sheet has a plurality of parallel lenticular lines between said plurality of lenticules, each said lenticular line being parallel to a second axis;
   wherein said acute angle is selected for an intersection between said first and second axes according to a function of a resolution of said interlaced composite image and a pitch of said lenticular lens sheet; and
   wherein said lenticular lens sheet is positioned so that said intersection forms said acute angle.

2. The method of claim 1, wherein said interlaced composite image is printed on a side of said lenticular lens sheet.

3. The method of claim 1, wherein said printing comprises printing said interlaced composite image on a medium; further comprising fixating said lenticular lens sheet in relation to said medium.

4. The method of claim 3, wherein said printing comprises printing said interlaced composite image on said medium to said lenticular lens sheet.

5. The method of claim 1, wherein said acute angle is adapted to a resolution of said interlaced composite image and a pitch of said lenticular lens sheet.

6. The method of claim 1, wherein said interlaced composite image having a plurality of bands tilted in about said acute angle.

7. The method of claim 1, wherein said selecting comprises calculating said acute angle so that said resolution divided by said pitch multiple a cosine of said acute angle equals an integer.

8. The method of claim 1, wherein said selecting comprising:
- sequentially adjusting said acute angle in a plurality of trial sessions,
- allowing an observer to determine when a lenticular imaging article generated by positioning said lenticular lens sheet in front of said interlaced composite image has low banding artifact according to said plurality of trial sessions, and
- fixating said adjusted acute angle according to said observer's determination.

9. The method of claim 1, wherein said printing comprises printing said interlaced composite image on a medium, said positioning comprising attaching said medium to said lenticular lens sheet.

* * * * *